May 26, 1931. F. HENRARD 1,806,684
MIXER
Filed Oct. 4, 1929
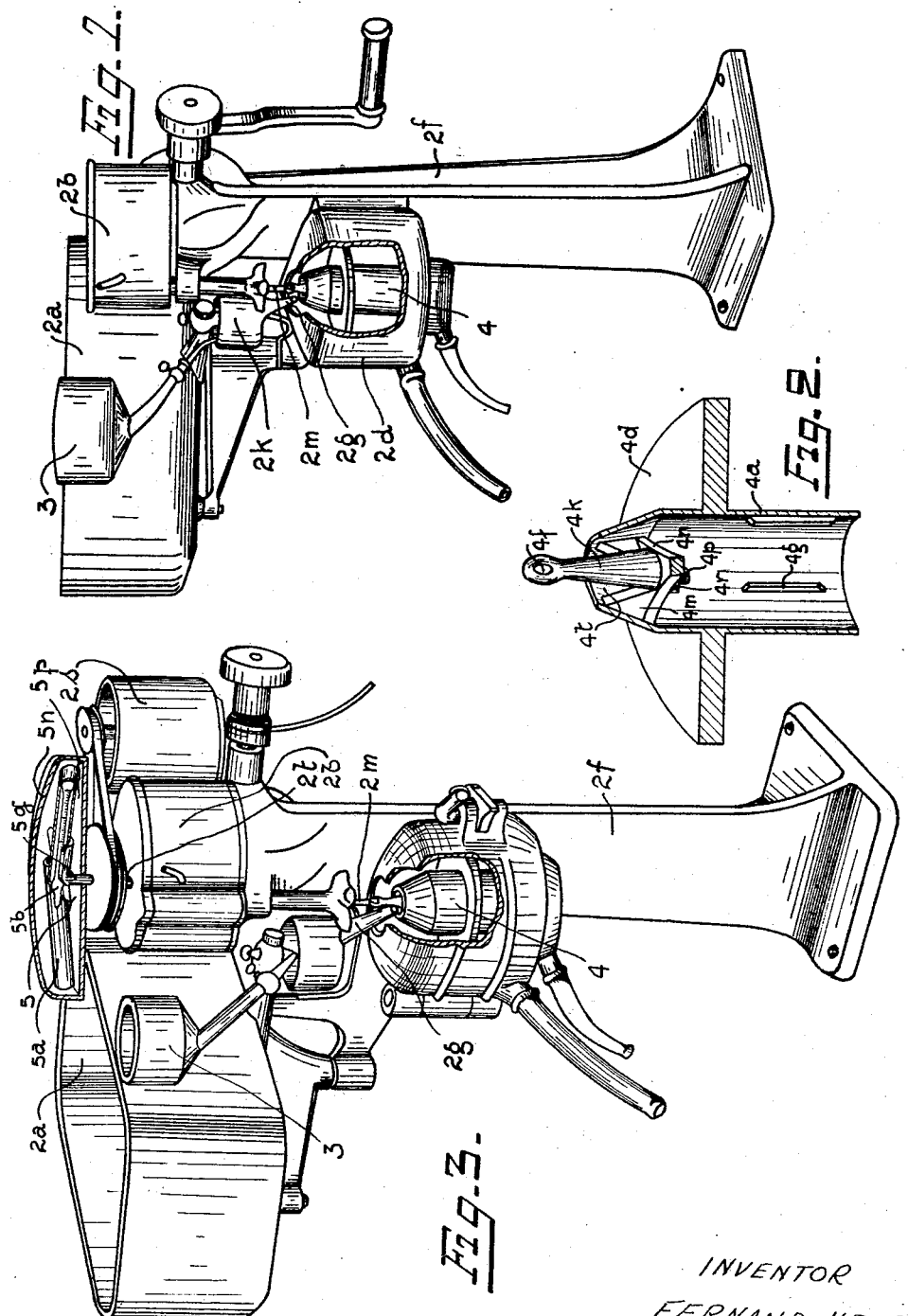
INVENTOR
FERNAND HENRARD
by his Attorney
Emil Bonnelycke Patented May 26, 1931

1,806,684

UNITED STATES PATENT OFFICE

FERNAND HENRARD, OF BRUSSELS, BELGIUM

MIXER

Application filed October 4, 1929. Serial No. 397,281.

Under agricultural conditions at present in existence the whey, after separating the milk therefrom, generally serves as food for animals. The nutritive value of this whey is, however, very low as it only contains a small quantity of fat.

For the purpose of increasing the nutritive value of the whey a body of high nutritive value, but of relatively low cost, is incorporated in the whey.

The present invention relates to a separator on which are disposed accessory members to adapt the same for use as a mixer.

According to the invention the mixer serves as means for effecting the mixing of a fatty body and the whey while they are being subjected to a rotary movement.

The invention also provides that the mixture of the whey and the fatty body may be obtained by spreading or dispersing the fluid, containing the fatty body and the whey, in the form of a stream in a sleeve.

For the purpose of effecting the said dispersion of the fluid, the sleeve may be provided interiorly at the upper portion thereof with blades disposed in the form of a helix; and it may also be provided in its interior with axial ribs in order to obtain a more efficient movement of the mixture.

Finally a more efficient balancing of the said sleeve may be obtained by employing a disc arranged at right angles to the axis of the sleeve.

The accompanying drawings illustrate by way of example and in a non-limiting manner, two forms of construction in accordance with the invention. The invention includes various features which will appear from the following description.

In the accompanying drawings:—

Figure 1 is a perspective view, partly broken away, of the improved device for mixing the whey with a fatty body.

Figure 2 is a part-sectional perspective view of the mixing sleeve.

Figure 3 is a perspective view of a mixer for mixing the whey and the fatty body having a device for determining the content of fat in the milk.

The mixer shown in Figure 1 is provided with a milk tank $2a$, a driving mechanism $2b$, a protecting casing $2d$ and a support $2f$ serving to carry, a tank 3 adapted to contain a fatty body, and a device 4 enabling the fatty body to be mixed with the whey by imparting a rotary movement to the two substances.

The whey content in the tank $2a$ and the fatty body content in the tank 3 are passed into a distributor $2k$ provided with a spout $2g$ leading into the upper portion of the casing $2d$.

For the purpose of driving the mixing device 4, the latter, which is formed by a sleeve $4a$ (Figure 2), is connected mechanically to the driving mechanism $2b$ of the mixer. For the purpose of obtaining intimate mixing of the fatty body and the whey, these substances are conducted by the spout $2g$ into the truncated open upper end $4t$ of the sleeve $4a$ where they are divided into a stream by reason of the vertical blades $4m$ arranged in the form of a helix in the upper portion of the said sleeve. These blades arranged at 120° apart, are connected together at their lower portion $4n$ where they are provided with a central orifice not shown in the drawings.

In order to obtain a more efficient movement of the mixed fluid, which is projected against the inner wall of the sleeve $4a$, the latter is provided integrally with axial ribs $4g$; and to balance the sleeve $4a$ a disc $4d$, cast integral with the sleeve, is arranged at right angles to the axis of the sleeve.

The connection of the sleeve $4a$ to the shaft $2m$ of the driving mechanism $2b$ of the mixer is effected by means of a truncated rod $4k$, which is provided at its upper end with an eye $4f$ adapted to be engaged by a hook on the shaft $2m$. The lower reduced and screw threaded end $4p$ of this rod passes through the central orifice provided in the lower portion $4n$ of the blades $4m$ and is secured thereto by a nut $4r$.

The invention also includes the feature of using the mixer as a support for a testing device (Figure 3) enabling the fat to be separated from the milk by subjecting them to a rotary movement in such a manner as to determine the content of fat in the milk.

According to the invention the testing device 5 (Figure 3) is disposed above a gear train of the driving mechanism 2b and is connected to the mechanism of the mixer.

The testing device 5 is provided with two cylindrical bodies such as 5a, mounted substantially horizontally in a circular dished plate 5p, secured by a screw, not shown in the drawings, to the frame work of the mechanism 2b.

The two bodies 5a, of substantially the same diameter and secured to a hollow shaft 5g, enclose between them graduated tubes 5b which dip into the milk contained in the said bodies 5a and of which it is desired to determine the content of fat.

In order to avoid any accident during the rotation of the cylindrical bodies 5a, the hollow shaft 5g is mounted with slight friction on the shaft 2t so as to slide on the shaft 2t when the bodies 5a meet with a certain resistance during their movement. This shaft 2t is the driving shaft of the mechanism 2b of the mixer and is driven by means of a belt by an electric motor 2s.

For the purpose of protecting the bodies 5a against external influences a cover 5n is placed on the plate 5p.

According to the invention, the mixer, as illustrated in Figure 3 serves both as a support for the tank 3 and the testing device 5.

I claim:

1. In a mixer of the kind described, a support; a fatty substance container thereon; a whey container also carried by the support; a distributor communicating with the containers; a casing below the distributor and having an open top; a mixing sleeve within the casing and having a truncated conical upper open end confronting the open top of said casing; blades within the truncated conical upper end; a spout leading from the distributor to said truncated conical upper end; and means passed through the open top of the casing and connected with the sleeve to rotate the same.

2. In a mixer of the kind described, a support; a fatty substance container thereon; a whey container also carried by the support; a distributor communicating with the containers; a casing below the distributor and having an open top; a mixing sleeve within the casing and having a truncated conical upper open end confronting the open top of the casing; blades within the truncated conical upper end; a spout leading from the distributor to said truncated conical upper end; means passed through the open top of the casing and connected with the sleeve to rotate the same; and a disc-like flange exteriorly on the sleeve.

3. In a mixer of the kind described, a support; a fatty substance container thereon; a whey container also carried by the support; a distributor communicating with the containers; a casing below the distributor and having an open top; a mixing sleeve within the casing and having a truncated conical upper open end confronting the open top of the casing; blades within the truncated conical upper end; a spout leading from the distributor to said truncated conical upper end; means passed through the open top of the casing and connected with the sleeve to permit rotation of the same; a disc-like flange exteriorly on the sleeve; and internal ribs formed axially on the sleeve.

4. In a mixer of the kind described, a support; a fatty substance container thereon; a whey container also carried by the support; a distributor communicating with the containers; a casing below the distributor and having on open top; a mixing sleeve within the casing and having a truncated conical upper open end confronting the open top of the casing; blades within the truncated conical upper end; a spout leading from the distributor to said truncated conical upper end; means passed through the open top of the casing and connected with the sleeve to permit rotation of the same; a disc-like flange exteriorly on the sleeve; internal ribs formed axially on the sleeve; and means for driving the last-named means.

5. In a mixer of the kind described, a fatty substance container thereon; a whey container also carried by the support; a distributor communicating with the containers; a casing below the distributor and having an open top; a mixing sleeve within the casing and having a truncated conical upper open end confronting the open top of the casing; blades within the truncated conical upper end; a spout leading from the distributor to said truncated conical upper end; means passed through the open top of the casing and connected with the sleeve to permit rotation of the same; a disc-like flange exteriorly on the sleeve; internal ribs formed axially on the sleeve; and means for driving the last-named means, said spout being constructed to effect a stream against the blades.

In testimony whereof I have affixed my signature.

FERNAND HENRARD.